United States Patent [19]
Panak et al.

[11] 3,817,337
[45] June 18, 1974

[54] MACHINE FOR MAKING HOLES IN PUTTING GREENS

[76] Inventors: Philip F. Panak; Elwin J. Bronson, both of Rt. No. 2, Kinsman, Ohio 44428

[22] Filed: Sept. 8, 1972

[21] Appl. No.: 287,547

[52] U.S. Cl. ............... 175/162, 175/313, 173/159, 172/22
[51] Int. Cl. ........................................... E21b 19/08
[58] Field of Search ......... 175/113, 162, 27, 51, 94, 175/122, 203, 313, 316; 173/19, 157, 158, 159, 29, 141, 143; 37/189; 172/22, 110, 111

[56] References Cited
UNITED STATES PATENTS

| | | | |
|---|---|---|---|
| 2,594,098 | 4/1952 | Vanderzee | 173/158 X |
| 2,709,368 | 5/1955 | Wolpert | 175/162 X |
| 2,881,844 | 4/1959 | Miller | 172/22 |
| 3,017,935 | 1/1962 | Galbraith et al. | 173/159 X |
| 3,038,546 | 6/1962 | Blubaugh et al. | 175/313 X |
| 3,152,653 | 10/1964 | Sievers | 175/313 X |
| 3,224,512 | 12/1965 | Alexander | 175/51 X |
| 3,327,789 | 6/1967 | Furuseth | 173/159 X |
| 3,406,768 | 10/1968 | Miller | 175/162 |
| 3,525,404 | 8/1970 | Newman et al. | 173/158 X |

*Primary Examiner*—James R. Boler
*Attorney, Agent, or Firm*—Webster B. Harpman

[57] ABSTRACT

A machine for making holes in putting greens positions a vertically movable rotatable cutting cylinder for manual and hydraulic operation. Controls for hydraulic fluid supplied the device act to move the cutting cylinder downwardly until the action is resisted whereupon the cutting cylinder is revolved. Stripping means mounted in the cutting cylinder eject a plug of turf and dirt therefrom when the cutting cylinder is elevated.

3 Claims, 6 Drawing Figures

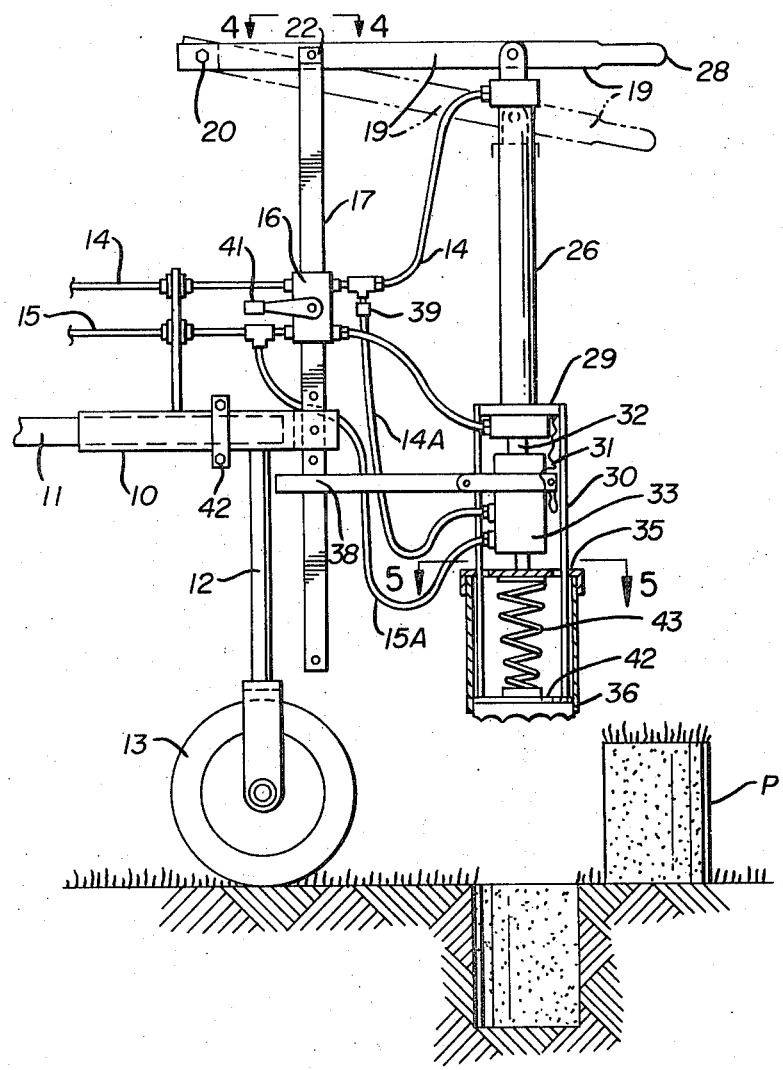
FIG. 2
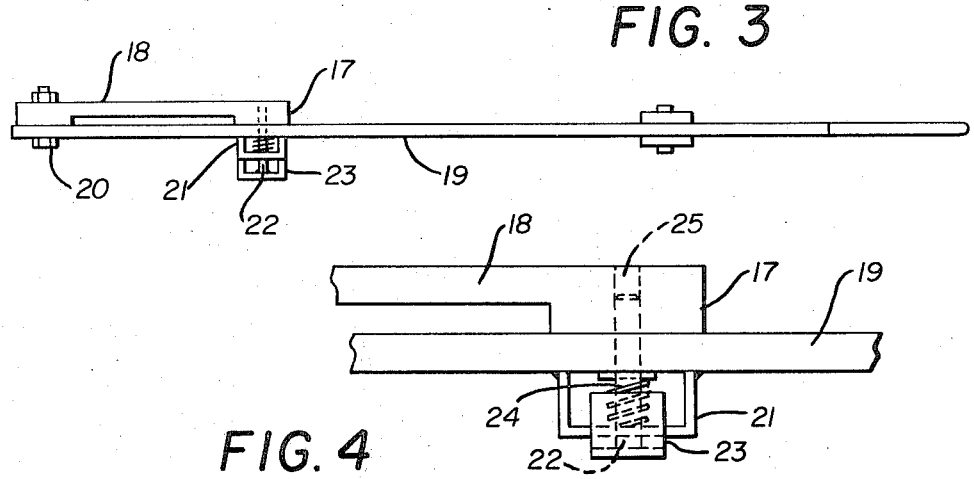
FIG. 3
FIG. 4

MACHINE FOR MAKING HOLES IN PUTTING GREENS

BACKGROUND OF THE INVENTION

1. Field of the Invention

This invention relates to devices for forming holes in golf course greens and the like wherein a plug of turf and soil is removed.

2. Description of the Prior Art

Prior devices of this type include soil sampling devices wherein soil sampling tubes are moved vertically such as in U.S. Pat. No. 3,224,512 while U.S. Pat. No. 2,881,844 positions a turf plug cutter for vertical motion. A similar structure is found in Pat. No. 2,863,258 which incorporates a cutting blade movable inunder the cutter and Pat. No. 3,331,249 discloses a soil sampling device.

This invention provides for the initial manual actuation of the cutting cylinder, the subsequent hydraulic actuation thereof and the automatic rotation thereof, hydraulically, when downward travel of the cutting cylinder is restrained.

SUMMARY OF THE INVENTION

A machine for making holes in putting greens is preferably mounted on and generally supported by a greens mower or similar device having a source of hydraulic fluid under pressure to which the device of the invention is attached. A cutting cylinder is positioned on the drive shaft of a rotary motor which is carried on a piston of a hydraulic cylinder which in turn is pivotally supported on a manually actuated arm which is supported in pivotal relation to the remainder of the device.

A latch means normally secures the arm in fixed relation to the remainder of the device and is movable to permit it to be raised and lowered as in imparting a quick cutting stroke to the cutting cylinder of the device.

DESCRIPTION OF THE DRAWINGS

FIG. 2 is a side view of the device of the invention showing the same in elevated relation and a plug cut thereby positioned adjacent thereto.

FIG. 3 is a top plan view on line 3—3 of FIG. 1 showing the manually actuating arm of the device.

FIG. 4 is an enlarged detail with parts broken away and taken on line 4—4 of FIG. 2.

DESCRIPTION OF THE PREFERRED EMBODIMENT

Figure 1:
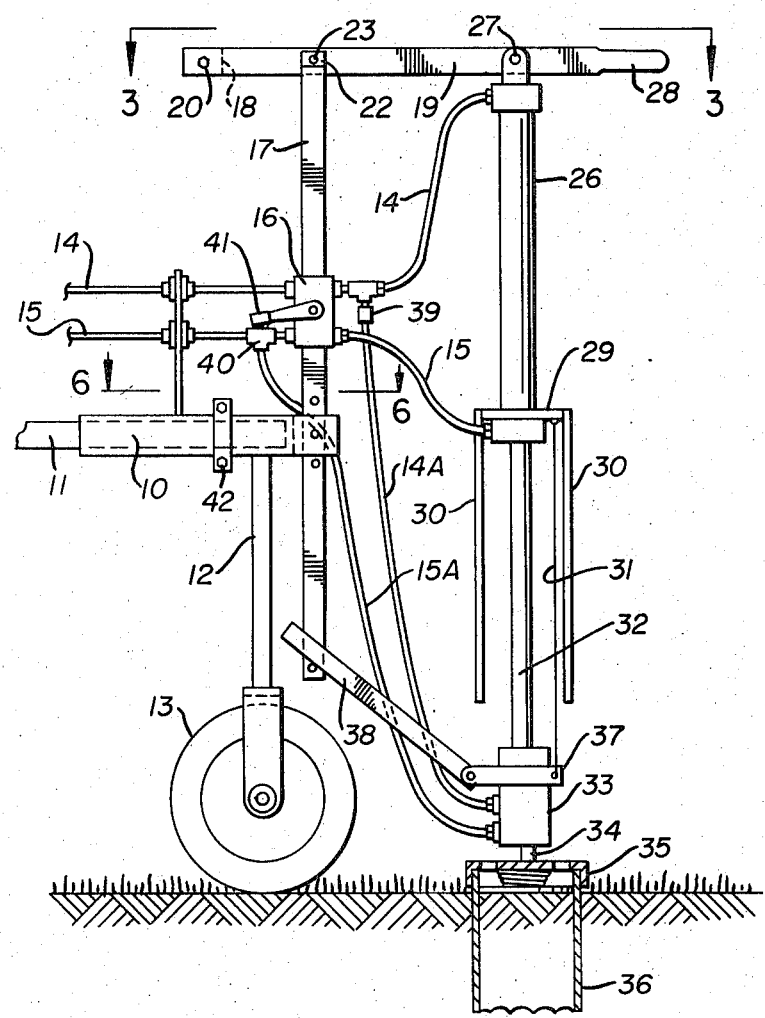
FIG. 1 is a side view of the device of the invention showing the cutting cylinder engaged in the turf and soil.

In the form of the invention chosen for illustration the machine for making holes in putting greens and removing a plug of turf and soil therefrom so that it can be positioned in a similar hole as customary in moving the golf cup in a putting green is comprised of a mounting bracket 10 adjustably clamped on a horizontal support 11 which in turn is provided with a vertical leg 12 having a ground engaging wheel 13 on its lower end. The horizontal support 11 is preferably carried by a device such as a greens mower or other wheeled vehicle that has a hydraulic pump for supplying hydraulic fluid under pressure and tubular connection means 14 and 15 are shown communicating with a control valve 16 which is carried on a vertical support 17 which in turn is adjustably mounted on one end of the mounting bracket 10. The vertical support 17 has a sideward extension 18 on its upper end to which a thrust arm 19 is pivoted as by a pivot 20 as best seen in FIG. 3 of the drawings.

In FIGS. 3 and 4 of the drawings it will be seen that latch means are provided to secure the thrust arm 19 in horizontal position as seen in FIGS. 1, 2 and 4 of the drawings and where it is aligned with the sideward extension 18 of the vertical support 17 as seen in FIG. 3 of the drawings. The latch means comprises a U-shaped bracket 21 having a pin 22 movably positioned therethrough which is provided with a bifurcated keeper 23 on the outer end thereof. A spring 24 normally urges the pin into an opening 25 in the upper end of the vertical support 17 in which position it will hold the thrust arm 19 in fixed position and as illustrated in FIG. 4 of the drawings. When the keeper 23 is moved outwardly along with the pin 22 it will free the thrust arm 19 so that it can be moved in a vertical arc spaced on the pivot 20.

By referring again to FIGS. 1 and 2 of the drawings, it will be seen that a hydraulic cylinder 26 is pivoted as at 27 to the thrust arm 19 inwardly from the outer end of the same which is shaped to form a suitable handle 28. The cylinder 26 has a collar 29 on its lower end which carries a pair of depending guide rods 30 and a flexible cable 31. A piston rod 32 extends out of the cylinder 26 and supports a hydraulic motor 33 on its lower end the drive shaft 34 of which is engaged on an apertured cap 35 of a cutting cylinder 36. A bracket 37 on the hydraulic motor 33 is attached to the cable 31 which acts as a restraint means and a torque arm 38 pivoted to the bracket 37 is arranged to slidably engage the lower portion of the vertical support 17 heretofore referred to so as to prevent rotation of the housing of the hydraulic motor 33 when the same is actuated.

Still referring to FIGS. 1 and 2 of the drawings, it will be seen that the hydraulic fluid supply lines 14 and 15 extend from the valve 16 to the upper and lower ends of the cylinder 26 and that extensions thereof indicated by the numerals 14A and 15A communicate therewith and with the hydraulic motor 33. The extension line 14A communicates with the line 14 by way of a pressure actuated valve 39 which is preset to open upon a predetermined pressure existing in the line 14 and which pressure is in excess of that required to move the piston 32 and cutting cylinder 36 downwardly into turf and soft soil. The line 15A communicates directly with a T-fitting 40 in the hydraulic line 15 on the return side of the valve 16 and the valve 16 is arranged to open and close communication through the hydraulic lines 14 and 15 as will be understood by those skilled in the art and is provided with a manually actuated lever 41 for that purpose.

By referring now to FIG. 2 of the drawings, it will be seen that a stripper plate 42 is positioned in the cutting cylinder 36 together with a coil spring 43 normally urging the stripper plate 42 inwardly, upwardly, of the cutting cylinder 36. The guide rods 30 will also be seen to be engaged in the apertured cap 35 and engaged against the stripper plate 42 so as to have moved it to a lower position therein where it will expel a plug of turf and soil as indicated in FIG. 2 of the drawings.

Figure 5:
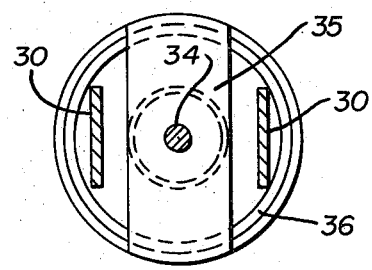
FIG. 5 is an enlarged detail on line 5—5 of FIG. 2.

By referring now to FIG. 5 of the drawings, an enlarged detail of the apertured cap 35 may be seen with the guides 30 engaged in the apertures therein.

Figure 6:
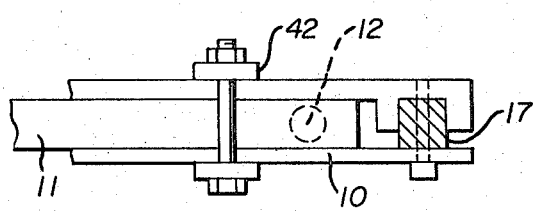
FIG. 6 is an enlarged detail on line 6—6 of FIG. 1.

In FIG. 6 of the drawings, an enlarged detail of the mounting bracket 10 may be seen which incorporates a compression clamp 42.

By referring to FIG. 2 of the drawings, it will be seen that at the beginning of a cutting cycle the piston rod 32 and hydraulic motor 33 on the end thereof are retracted relative to the cylinder 26. Assuming the device is connected to a source of suitable hydraulic fluid under pressure the lever 41 on the valve 16 is moved to energize the cylinder 26 and the piston rod 32, hydraulic motor 33 and cutting cylinder 36 moved downwardly thereby into close proximity to the turf to be cut whereupon the valve 16 is closed, the latch keeper 23 is disengaged from its engagement in the opening 25 in the vertical support 17 and the thrust arm 19 is capable of vertical movement applied manually thereto. The thrust arm 19 is then manually moved rapidly to perform a desired quick cutting action with respect to the turf. The keeper 23 is then released, the valve 16 again opened, and as the cylinder 26 is energized the thrust arm 19 will move to horizontal position as seen in solid lines in FIGS. 1 and 2 of the drawings and be retained in that position as hereinbefore described. The hydraulic energy will thus force the cutting cylinder 36 downwardly into the soil below the turf and this action continues until such time as the downward movement of the cutting cylinder 36 is restrained as by undue friction or compacted soil, etc. whereupon the hydraulic pressure increases in the cylinder 26 and the supply line 14 to a point where the pressure actuated valve 39 opens and hydraulic fluid is then supplied the hydraulic motor 33 which rotates the cutting cylinder 36 to facilitate its further downward travel. When it reaches the maximum depth permitted by the cable 31 the valve 16 is reversed so that hydraulic fluid pressure now retracts the piston 32 relative to the cylinder 26 and elevates the cutting cylinder 36. As it moves upwardly, the guide rods 30 engage the relatively large apertures in the cap 35 and the upper surface of the stripper plate 42 and thus push the plug P outwardly of the cutting cylinder as seen in FIG. 2 of the drawings.

During the vertical travel of the cutting cylinder the hydraulic motor 33 has been prevented from rotating by the action of the torque arm 38 heretofore referred to which is travelled relative to the lower portion of the vertical support 17 between limiting pins positioned therethrough.

It will thus be seen that a machine for making holes in putting greens suitable for installing golf cups therein has been disclosed.

Although but one embodiment of the present invention has been illustrated and described it will be apparent to those skilled in the art that various changes and modifications may be made therein without departing from the spirit of the invention.

We claim:

1. A machine for making holes in putting greens including a supporting frame, a thrust arm, means pivotally connecting said thrust arm to said supporting frame and a hydraulic piston and cylinder assembly positioned therebelow, means pivotally connecting said hydraulic piston and cylinder assembly to said thrust arm, a rotary hydraulic motor including a drive shaft carried by said piston and a cutting cylinder secured to said drive shaft, a source of fluid pressure and means connecting said hydraulic piston and cylinder and rotary hydraulic motor to said source, a first valve means controlling said fluid pressure with respect to said hydraulic piston and cylinder whereby said cutting cylinder may be moved vertically thereby and a second valve means that is pressure responsive in opening in communication with said means connecting said source of fluid pressure with said hydraulic piston and cylinder and in communication with said rotary hydraulic motor and responsive in operation to an increase in fluid pressure in said connecting means whereby said cutting cylinder may be rotated thereby upon an increase in pressure in said connecting means.

2. The machine for making holes in putting greens set forth in claim 1 and wherein the pressure responsive valve controls the fluid pressure delivered to said rotary hydraulic motor and is arranged to open communication upon an increase of pressure relative to that necessary to move said hydraulic piston and cylinder.

3. The machine for making holes in putting greens set forth in claim 1 and wherein said support means includes a vertical member having a sideward extension at its upper and and the thrust arm is pivoted to the outer end of the sideward extension and latch means are provided for securing said thrust arm in releasable engagement with said sideward extension so as to hold said thrust arm in a predetermined fixed position.

* * * * *